Patented Apr. 1, 1924.

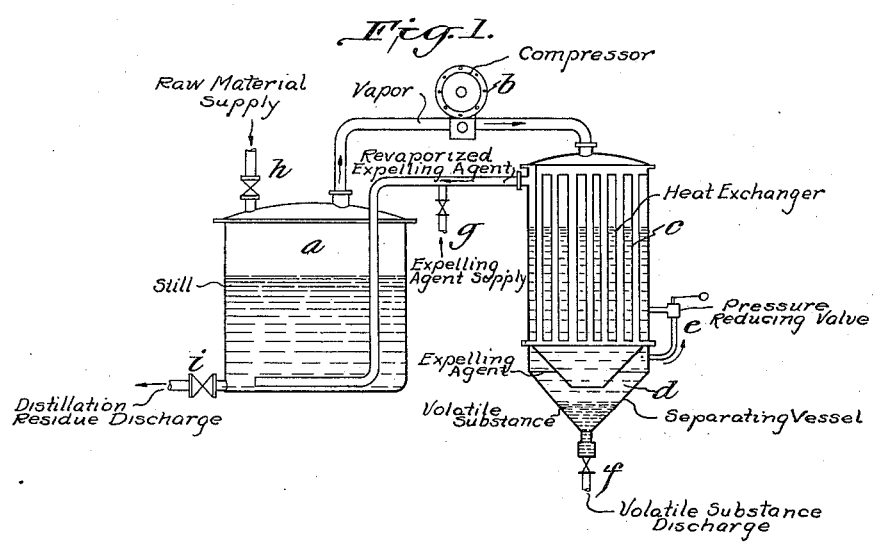
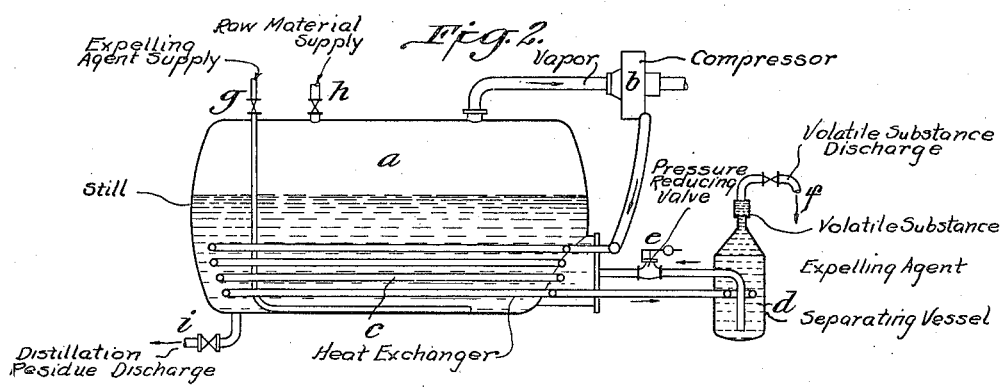

1,489,009

UNITED STATES PATENT OFFICE.

MARTIN ROHMER, OF HOFHEIM, NEAR TAUNUS, AND KARL BLUMRICH, OF HOECHST-ON-THE-MAIN, GERMANY, ASSIGNORS TO FARBWERKE VORM. MEISTER LUCIUS & BRÜNING, OF HOECHST-ON-THE-MAIN, GERMANY, A CORPORATION OF GERMANY.

PROCESS FOR THE EXPULSION OF VOLATILE SUBSTANCES BY MEANS OF STREAMING VAPORS.

Application filed February 14, 1924. Serial No. 692,844.

*To all whom it may concern:*

Be it known that we, MARTIN ROHMER and KARL BLUMRICH, citizens of France and Germany, respectively, residing at Hofheim, near Taunus, and Hoechst-on-the-Main, Germany, respectively, have invented certain new and useful Improvements in Processes for the Expulsion of Volatile Substances by Means of Streaming Vapors, of which the following is a specification.

The known process of separating volatile substances from other materials by means of gaseous expelling agents, for example, the process of steam distilling volatile organic substances, has become very expensive and in some cases uneconomical, due to the increase in the cost of the fuel required for the generation of the steam or other gaseous expelling agent. In recent years the so-called waste steam discharged from distilling and evaporating apparatus has been utilized in various ways with good results, for instance for other heating purposes and by carrying out the evaporation in the so-called multiple effect evaporating apparatus. It has also been proposed in evaporating and distilling operations to handle the steam under pressure and in a cyclical manner.

Our present invention resides in a process for the separation of volatile substances from other materials by means of expelling agents such as steam in which the expelling agents are handled in a cyclical manner and in which the expelled volatile substances are separated from the expelling agents and the latter returned to the distilling step so that the heat required for the generation of the expelling gases is conserved. This is accomplished by condensing the mixture of the expelling agent and the volatile substance formed in the distilling step by compression and cooling, separating the liquefied expelling agent from the volatile substance, revaporizing the separated expelling agent by releasing the pressure thereon and by heat transfer thereto from the condensing mixture and returning the revaporized expelling agent to the distilling step.

The transfer of heat from the condensing mixture of the expelling agent and volatile substance to the separated expelling agent to be revaporized may take place in a separate heat exchanging apparatus or in a heat exchanger within the distilling vessel.

The increasing of the pressure upon the expelling agent at one point in its cycle for the purpose of condensing it may be accomplished by means of any known device, such as for instance a turbo-blast engine or a steam-jet injector, and the releasing of the pressure upon the separated liquefied expelling agent for revaporizing the same may be accomplished by any suitable means such as a throttle device or a weight-controlled valve. If a sufficiently large surface for an efficient heat exchange between the condensing and the vaporizing expelling agent is provided, the difference in pressure, at these two points in the cycle of the expelling agent, as well as the difference in temperature which must be maintained, will be very small.

The transitory condensation of the distillate permits the separation of the expelled volatile substance therefrom, which separation may take place under the pressure of the condensate or in any other suitable way.

In general, heat must be introduced into the system only for the purpose of heating the material from which volatile substance is to be expelled and to compensate for heat losses in so far as such heat losses are not compensated by the heat liberated by the compression of the distillate in condensing it, because the heat required for evaporating the expelling agent is recovered by the condensation thereof. In some cases the saving of heat exceeds 80%.

By using a column still the process may be made continuous, as will be apparent. Due to the fact that the expelling agent moves in a closed cycle and the losses thereof therefore are very small the process is particularly well adapted to the use of expelling agents other than steam.

On the accompanying drawings,

Fig. 1 is a vertical elevation, partly in section, of one form of apparatus; and Fig. 2 is a vertical elevation, partly in section, of another form of apparatus suitable for the carrying out of the process.

On Fig. 1, *a* is a distilling vessel, *b*, a piston blast-engine, *c* a heat exchanger in the form of a tubular boiler, *d* a separating chamber, *e* a pressure reducing valve, *f* a discharge for separated volatile substance, $g$ an inlet for steam and $h$ and $i$ supply and discharge pipes, respectively, for the material to be distilled.

On Fig. 2, $a$ is the distilling vessel, $b$ a turbo-blast engine, $c$ a serpentine tube heat exchanger, $d$ a separating chamber, $e$ a pressure reducing valve, $f$ a discharge for separated volatile substance, $g$ a steam supply pipe and $h$ and $i$ supply and discharge pipes, respectively, for material to be distilled.

The process is carried out in the apparatus illustrated in Fig. 1 as follows:—The gaseous mixture of volatile substance and expelling agent formed in the distilling vessel $a$ is compressed by the blast engine $b$ into the heat exchanger $c$ in which it is cooled and liquefied by heat exchange with the expanding and revaporizing expelling agent delivered thereto through the pressure reducing valve $e$ from the separating vessel $d$. The liquefied mixture of volatile substance and expelling agent formed in $c$ flows into the separating vessel $d$ in which the volatile substance collects at the bottom and is withdrawn through $f$. The liquefied expelling agent separated in $d$ flows through the pressure reducing valve $e$ into the exchanger $c$ where it is vaporized as a result of the reduction in pressure upon it and the heat supplied to it from the condensing distillate and the resulting revaporized expelling agent flows back into the distilling vessel $a$ as indicated. Heat is supplied to make up for losses as required by the introduction of vaporizing agent at $g$. Fresh material to be distilled is supplied to the distilling vessel $a$ at $h$ and the undistilled residue is discharged at $i$.

The operation of the process in the apparatus illustrated in Fig. 2 is exactly the same as that described in connection with Fig. 1, excepting that the heat exchanger $c$ is mounted in the distilling vessel $a$ and the separating vessel $d$ is designed for the separation of volatile substances which are lighter than the liquefied expelling agent. It is noted in connection with the apparatus illustrated in Fig. 2 that a sufficient quantity of the separating agent must be maintained in the distilling vessel $a$ to completely cover the tubular body of the heat exchanger $c$. Due to the fact that the pressure upon the separated expelling agent to be revaporized in the heat exchanger $c$ is maintained less than the pressure on the mixture of expelling agent and volatile substance delivered to $c$ by the pump $b$ only a slight difference in temperature must be maintained in order to accomplish the necessary heat exchange.

Further examples of apparatus suitable for carrying out the invention will be apparent to one skilled in the art. For example, the distilling vessel $a$ may be a column still adapted for continuous operation, the pump $b$ may be an injector, the heat exchanger $c$ may be a serpentine cooler mounted in a separate closed vessel, the seperator $d$ may be of the centrifugal type, and the pressure reducing valve $e$ may be simply a vertical pipe providing a hydrostatic pressure difference between its bottom and top. Instead of supplying heat to the apparatus by means of steam a dircet fire may be used. In case the volatile substance is more or less soluble in the expelling agent an extracting device may be provided following the separating chamber for separating the remainder of the volatile substance from the expelling agent.

Having now described our invention, what we claim is:

Process of separating a volatile substance from a non-gaseous material, comprising passing a gaseous expelling agent in contact with the non-gaseous material, said volatile substance when in a non-gaseous condition being essentially immiscible with a non-gaseous form of said expelling agent, condensing at least a portion of both the expelling agent and the volatile substance in the resulting gaseous mixture by compressing the same and abstracting heat therefrom, separating a part at least of the expelling agent from the resulting condensate, reducing the pressure on the said separated expelling agent and revaporizing the same by conveying said abstracted heat thereto, and passing the resulting revaporized expelling agent in contact with said non-gaseous material.

In testimony whereof, we affix our signatures.

MARTIN ROHMER.
KARL BLUMRICH.

Witnesses:
JANE GUISTI,
PAUL A. WILLIAMS.